United States Patent [19]
Ida et al.

[11] Patent Number: 5,202,764
[45] Date of Patent: Apr. 13, 1993

[54] METHOD FOR REMOVING CODING/DECODING DISTORTION FROM MOVING-PICTURE IMAGE DATA AND IMAGE PROCESSING APPARATUS CAPABLE OF SMOOTHING IMAGE DISTORTION

[75] Inventors: Takashi Ida, Chiba; Kenshi Dachiku, Tokyo, both of Japan

[73] Assignee: Kabushiki Kaisha Toshiba, Kawasaki, Japan

[21] Appl. No.: 816,724

[22] Filed: Jan. 3, 1992

[30] Foreign Application Priority Data

Mar. 4, 1991 [JP] Japan ................................. 3-037110

[51] Int. Cl.$^5$ ............................................ H04N 5/217
[52] U.S. Cl. ...................................... 358/167; 358/85; 358/133
[58] Field of Search ................ 358/133, 135, 136, 167, 358/85

[56] References Cited

U.S. PATENT DOCUMENTS

| | | | |
|---|---|---|---|
| 4,442,454 | 4/1984 | Powell | 358/167 |
| 4,498,104 | 2/1985 | Schulz | 358/167 |
| 4,876,595 | 10/1989 | Veldhuis | 358/167 |

FOREIGN PATENT DOCUMENTS

| | | |
|---|---|---|
| 0345872 | 12/1989 | European Pat. Off. . |
| 3121599 | 12/1982 | Fed. Rep. of Germany . |
| 3311898 | 10/1984 | Fed. Rep. of Germany . |
| 63-246076 | 10/1988 | Japan . |
| 02-044884 | 2/1990 | Japan . |

OTHER PUBLICATIONS

1990 Spring National Convention Record, The Institute of Electronics, Information and Communication Engineers, Part 7, D-306, "A Noise Reduction Filter for MC-DCT Coding"; T. Ida, et al., Mar. 5, 1990.

Institute of Electronics, Information and Communication Engineers, vol. J66-A, No. 10, "Recursive $\epsilon$-Nonlinear Digital Filter", K. Arakawa, et al., Oct., 1983.

*Primary Examiner*—Howard W. Britton
*Attorney, Agent, or Firm*—Oblon, Spivak, McClelland, Maier & Neustadt

[57] ABSTRACT

In a moving-picture image signal processing system used in a so-called "video phone communication system", a coding/decoding distortion contained in a coded moving-picture image signal is removed therefrom. The image signal processing system includes a memory unit for previously storing plural coefficients of variation amounts with respect to pixel values of coded input image data; a subtraction unit for performing a subtraction between the pixel value of the coded input image data and a pixel value of reference image data to obtain a difference pixel value, the reference image data being obtained from distortion-free image data acquired during one image-data processing cycle before a present image-data processing cycle for the coded image data; and a distortion removing unit for removing a coding/decoding distortion contained in the input image data by processing the pixel value of the coded image data based upon these coefficients read out from the memory unit in repsonse to the difference pixel value, whereby distortion-free input image data is produced.

19 Claims, 14 Drawing Sheets

◎ PROCESSED PIXEL ● REFERRED PIXELS

| INPUT "d" | α | 1-α |
|---|---|---|
| −255 | 1 | 0 |
| −254 | 0.99 | 0.01 |
| ⋮ | ⋮ | ⋮ |
| −1 | 0.1 | 0.9 |
| 0 | 0 | 1 |
| +1 | 0.1 | 0.9 |
| ⋮ | ⋮ | ⋮ |
| +254 | 0.99 | 0.01 |
| +255 | 1 | 0 |

| INPUT "d" | VARIATION AMOUNT F(d) |
|---|---|
| −255 | −1 |
| −254 | −2 |
| ⋮ | ⋮ |
| −1 | −5 |
| 0 | 0 |
| +1 | 5 |
| ⋮ | ⋮ |
| +254 | 2 |
| +255 | 1 |

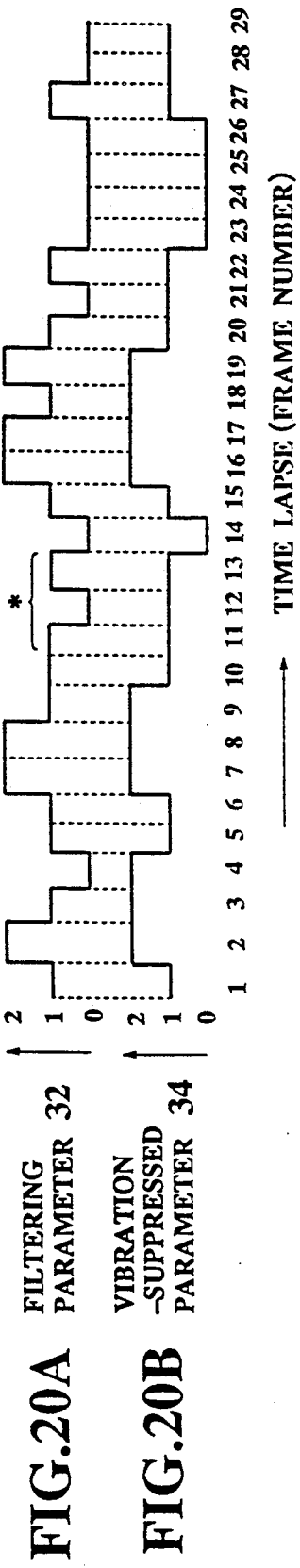
FIG.20A FILTERING PARAMETER 32
FIG.20B VIBRATION-SUPPRESSED PARAMETER 34
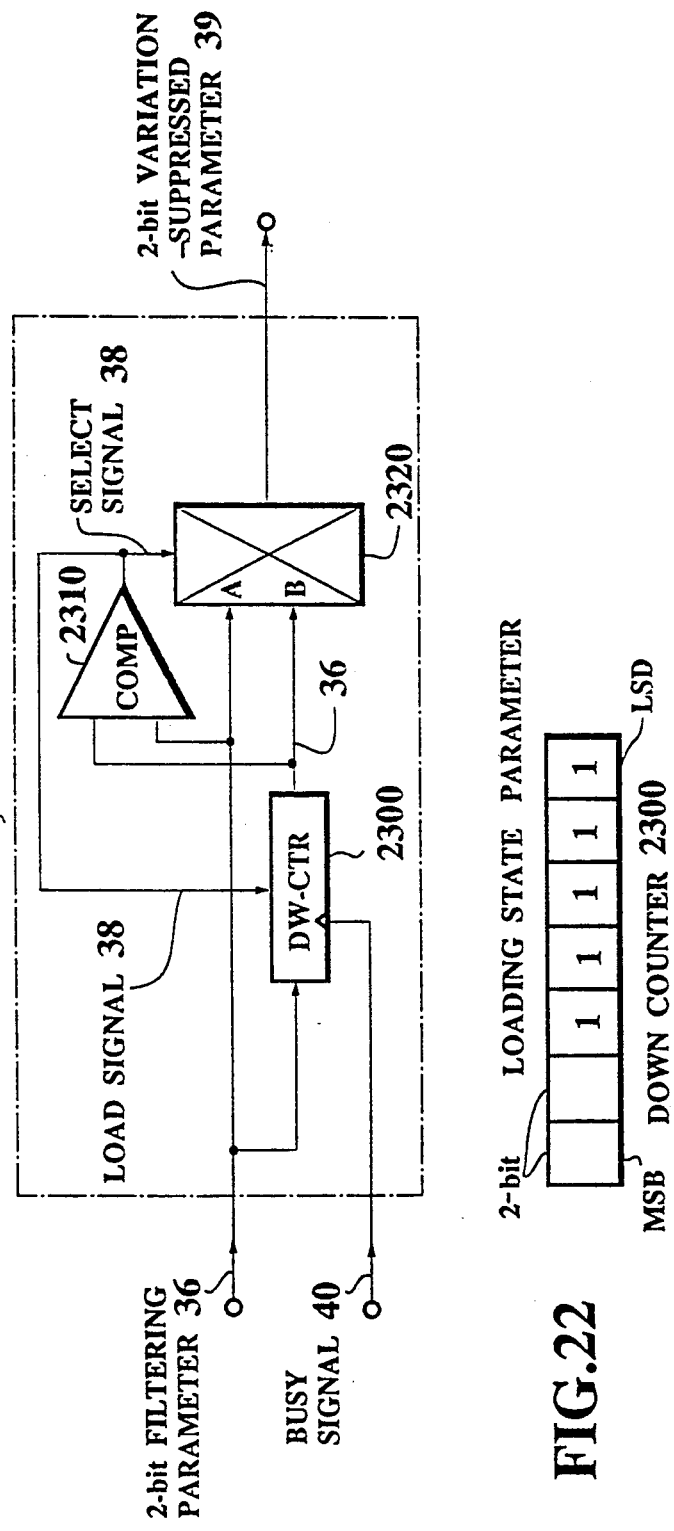
FIG.21
FIG.22

METHOD FOR REMOVING CODING/DECODING DISTORTION FROM MOVING-PICTURE IMAGE DATA AND IMAGE PROCESSING APPARATUS CAPABLE OF SMOOTHING IMAGE DISTORTION

BACKGROUND OF THE INVENTION

1. Field of the Invention

The present invention generally relates to a distortion removing method and an image processing apparatus used in, for instance, a so-called "video phone communication system". More specifically, the present invention is directed to such a distortion removing method and an image processing apparatus capable of eliminating coding/decoding distortions caused while input image data are coded/decoded.

2. Description of the Prior Art

Recently, so-called "video phone communication systems" and also "video conference communication systems" have been developed in which moving-picture signals are transmitted via the public telephone signal lines between the long distance terminals. As is known in this technical field, since the signal transmission capacity of the public telephone line is small, or limited to a very small value, if a moving-picture signal is transmitted via the public telephone line without performing any signal coding/decoding processing, a very heavy load is placed on this public telephone line. To avoid such a problem, an input image (moving picture) signal is once coded at a transmitter end, and then the coded image data is decoded into a desirable image (moving picture) signal at a receiver end. In general, a coding/decoding distortion appears in the reproduced (decoded) images.

To remove the coding/decoding distortions from the reproduced images displayed on monitors at the transmitter and receiver ends, various techniques have been proposed, for instance, transactions of the Institute of Electronics, Information and Communication Engineerings, Vol. 6, D-3 and D-63, issued on Aug. 15, 1989 "Non-recursive type 5×5 adaptive smoothing filter; Improvements in image quality for high-efficiency coding operation by post filtering" by KATO et al.

The contents of this conventional distortion removing method will now be summarized. As shown in FIG. 1, a central pixel is image-processed with reference to pixels located within a limited region defined by 5 pixels×5 pixels. In accordance with this conventional smoothing filter, only such pixels that own the values within a range of the value of the central pixel $\pm\epsilon$ (i.e., a preselected constant which has been determined based on experiences). are employed so as to remove the above-described coding/decoding distortion. Then, a weighed arithmetic mean value calculated from these pixels' values is used as a new value of the processed pixel. It should be noted that when a total number of the pixels among 25 pixels, the values of which are within the range of "$\pm\epsilon$", are equal to, or lower than "n" ("n" being an arbitrary integer), no change or substitution of the above-described value of the pixel to be processed is carried out. This is because a very small change occurring in the values of the referred pixels does not cause any change in the new pixel.

This conventional distortion removing method has such drawbacks that the total calculation amount becomes great, and thus a large number of memory devices required for performing these calculations are similarly needed, resulting in a large-scaled image processing apparatus.

To overcome the above-explained drawback, it may be readily conceived to reduce a total number of pixels to be referred for the average calculation, as represented in FIG. 2. However, if the total quantity of the pixel to be referred would be reduced, as compared with that of FIG. 1, distortion cannot be removed with satisfaction.

On the other hand, another distortion removing method has been proposed in transactions of the Institute of Electronics, Information and Communication Engineerings Vol. J66-A No. 10 "Recursive $\epsilon$-Nonlinear Digital Filter" K. ARAKAWA et al. October 1983, pages 947 to 854, which discloses the method for removing the coding/encoding distortion at higher efficiencies by employing the recursive filter. In accordance with this second conventional distortion removing method, the coding/decoding distortion can be removed to a satisfactory extent. Nevertheless, when the image pixel series whose pixel values are varied at a constant inclination as represented in FIG. 3A, the deviation in the values of the processed image pixels from those of the unprocessed image pixels is emphasized in accordance with progress in the processing operation, as indicated in FIG. 3B. Then, if the difference in the pixel values between the image pixels to be processed and those to be referred becomes higher than a predetermined value "$\epsilon$", the filtering process of this recursive filter is interrupted. In other words, the weighed mean value calculated from the values of the referred image pixels is no longer used as the new pixel value of the image pixel to be processed, and therefore the inputted pixel value is directly used as this new pixel value. On the other hand, as explained above, the filtering process of this second conventional method is turned ON/OFF based upon comparison results between a predetermined value "$\epsilon$" and the actual pixel values of the inputted image pixel series, there are newly caused distortions which do not appear before the above-described coding process is carried out.

Also, generally speaking, the wider the size of the quantizing step becomes, the larger the coding distortion becomes. Accordingly, for example, Applicants have proposed "A Noise Reduction Filter for MC-CDT Coding", No. D-306, Mar. 5, 1990, Institute of Electronic, Information and Communication Engineerings. That is, when a judgement whether or not the coding/decoding distortions are deleted every pixel, is executed based on comparison results between a predetermined vale "$\epsilon$" and a difference in the values of the processed pixel and referred pixel, the differences in these values of the processed pixels and referred pixels become great, as the sizes of the quantizing steps become wide. Accordingly, the total number of such judgements are similarly increased. In FIG. 4, there is shown a circuit block diagram of the receiption side of this noise reduction filter. In this receiption circuit of FIG. 4, the coded image data sent from the transmission side of this noise reduction filter (not shown) is decoded in the decoding unit 500 thereby to produce the decoded image data. Thereafter, the decoded image data is further processed in the noise reduction filter 510 so as to obtain distortion-free image data. Note that the sizes of the quantizing steps are detected from the coded image data by the decoding unit 500, and then the quantizing step sizes are converted in the conversion table 520 into the parameters which will be supplied to this noise reduction filter 510. The parameters control strengths of the filtering operation. In other words, the sizes of the quantizing steps are reflected as the strengths of the filtering operations.

However, the last-mentioned conventional distortion removing method has such a problem that when the sizes of the quantizing steps are intensively vibrated as time passes, the parameters to be supplied to the distortion removing filter 510 are also intensively vibrated in response to such rapidly changes in the quantizing step sizes. As a result, if the parameters to be supplied to the filter 510 would be varied every pixel as being executed in other conventional method, another problem may be produced in that peculiar differences would appear in the resultant image qualities caused by the filtering operations of the filter 510 in case that the sizes of the quantizing steps are intensively vibrated (for instance, several size-changes per 1 second).

As previously described in detail, there are various problems in these conventional image processing apparatuses. That is, firstly, since the filter for removing the coding/decoding distortion are controlled by comparing a predetermined value "$\epsilon$" with the difference between the values of the processed pixels and the values of the referred pixels, another coding/decoding distortion is newly produced, which is different from the above-described coding/decoding distortion, when the difference between the values of the processed pixels and the values of the referred pixels is equal to a predetermined value "$\epsilon$".

Secondly, when the sizes of the quantizing steps are intensively vibrated in view of temporal aspects, the strengths of the filtering operations by the distortion removing filter are intensively vibrated, so that peculiar differences appear in the image qualities of the reproduced images when the filtering operation is strongly effective, or weakly effective.

SUMMARY OF THE INVENTION

The present invention has been made so as to solve the above-described various problems, and therefore has an object providing an image processing apparatus capable of producing a distortion-free image signal without newly causing distortions by a filter for removing the coding/decoding distortion from the reproduced image signals.

Another object of the present invention is to provide a compact image processing apparatus capable of removing the coding/decoding distortion at higher efficiencies.

A further object of the present invention is to provide an image processing apparatus capable of smoothing the coding/decoding distortion by continuously controlling the coefficients of the smoothing filter at both a flat portion and an edge portion of an overall image.

A still further object of the present invention is to provide an image processing apparatus suitable for a video phone communication system and video conference communication system wherein moving pictures without any coding/decoding distortion are transmitted via a public telephone line having narrow pass bands between both of the monitor terminals.

To achieve the above-described objects and other features of the present invention, an image processing apparatus (1000) comprises:

memory means (90:92:95) for previously storing plural coefficients ($\alpha$, $1-\alpha$) of variation amounts for pixel values of coded input image data (2);

subtraction means (4) for performing a subtraction between the pixel value of said coded input image data (2) and a pixel value of reference image data (5) to obtain a difference pixel value (d), said reference image data (5) being obtained from distortion-free image data (19) acquired during one image-data processing cycle before a present image-data processing cycle for said coded image data (2); and, means (10A:10B:12) for removing a coding/decoding distortion contained in said coded input image data (2) by processing said pixel value of the coded image data (2) based upon said coefficients ($\alpha$, $1-\alpha$) read out from said memory means (90:92:95) in response to said difference pixel value (d), whereby distortion-free input image data is produced.

Also, according to another aspect of the present invention, an image processing apparatus (1400) comprises:

memory means (95) for previously storing plural coefficients ($\alpha$, $1-\alpha$) of variation amounts for pixel values of coded input image data (2), and for outputting at least one of said coefficients as a first coefficient ($\alpha$) in response to both said coded input image data (2) and reference image-data (5), said reference image data (5) being obtained from distortion-free image data (19) acquired during one image-data processing cycle before a present image-data processing cycle for said coded image data (2);

coefficient calculator means (25) for calculating a second coefficient ($1-\alpha$) based upon coefficient ($\alpha$) and a constant (1); and, means (10A:10B:12) for removing a coding/decoding distortion contained in said coded input image data (2) by processing said coded input image data (2) based upon said first and second coefficients ($\alpha:1-\alpha$), whereby distortion-free input image data (19) is produced.

As a further aspect of the present invention, an image processing apparatus (1100) comprises:

memory means (150) for previously storing a plurality of variation amounts (16) with respect to pixel values of coded input image data (2);

substraction means (4) for performing a substraction between the pixel value of said coded input image data (2) and a pixel value of reference image data (5) to obtain a difference pixel value (d), said reference image data (5) being obtained from distortion-free image data (19) acquired during one image-data processing cycle before a present image-data processing cycle for said coded input image data (2): and, means (12) for removing a coding/decoding distortion contained in said coded input image data (2) by processing said pixel value of the coded input image data (2) based upon one of said variation amounts selected in response to said difference pixel value (d), whereby distortion-free input image data is produced.

As another aspect of the present invention, an image processing apparatus (1500) comprises:

memory means (152) for previously storing a plurality of variation amounts (16) for pixel values of coded input image data (2), and for outputting one of said variation amounts (16) in response to both said coded input image data (2) and reference image data (28), said reference image data (28) being obtained from distortion-free image data (19) acquired during one image-data processing cycle before a present image-data processing cycle for said coded image data (2); and, means (12) for removing a coding/decoding distortion contained in said coded input image data (12) by processing said pixel value of the coded input image data (2) based upon said one of the variation amounts (16) selected in response to both said coded input image data (2) and the reference image data (28); whereby distortion-free input image data (28) is produced.

In accordance with another aspect of the present invention, an image processing apparatus (2000) comprises:

decoding means (500) for decoding pixel values of input image data (50) coded in quantizing step sizes (30) corresponding to the pixel values thereof to obtain at least decoded image data (52) and the quantizing step sizes (30) thereof;

memory means (520) for previously storing a plurality of filtering-operation parameters (32:36) corresponding to said quantizing step sizes (30);

parameter controlling means (2550) for controlling readout of said filter-operation parameters (32:36) from said memory means (520) to obtain controlled filtering-operation parameters (34:39) in such a manner that when said filtering-operation parameters (32:36) are increased, said parameter reading operation is continuously performed, whereas when said filtering-operation parameters (32:36) are decreased, said parameter reading operation is performed after a predetermined time period has passed; and, distortion removing means (2510) for removing a coding/decoding distortion from said decoded image data (52) based on said controlled filtering-operation parameter (34:39) read out from said memory means (520), whereby distortion-free image data (54) are obtained.

As a still further aspect of the present invention, a moving-picture image processing; method (1000:1200:1300) comprises the steps of:

previously storing plural coefficients ($\alpha$:1 − $\alpha$) of variation amounts for pixel values of coded moving-picture image data (2);

subtracting the pixel value of said coded moving-picture image data (2) from a pixel value of reference moving-picture image data (5), thereby obtaining a difference pixel value (d), said reference moving-picture image data (5) being obtained from distortion-free moving-picture image data (19) acquired during one image data processing cycle before a present image data processing cycle for said coded moving-picture image data (2); and, removing a coding/decoding distortion contained in said coded moving-picture image data (2) by processing said pixel value of the coded moving-picture image data (2) based upon said coefficients ($\alpha$:1 − $\alpha$) derived from said storing step in response to said difference pixel value (d), thereby producing distortion-free moving-picture image data.

As a still yet further aspect of the present invention, a moving-picture image processing method (2000) comprises the steps of:

decoding pixel values of the moving-picture image data which have been coded in quantizing step sizes (30) corresponding to the pixel values thereof, thereby obtaining at least decoded moving-picture image data (52) and the quantizing step sizes (30) thereof;

previously storing a plurality of filtering-operation parameters (32:36) corresponding to said quantizing step sizes (30);

controlling a reading operation of said filtering-operation parameters (32:36) in such a manner that when said filtering-operation parameters (32:36) are increased, said parameter reading operation is continuously performed, whereas when said filtering-operation parameter (32:36) are decreased, said parameter period operation is performed after a predetermined time period has passed, thereby obtaining controlled filtering-operation parameters (34:39) and, removing a coding/decoding distortion from said decoded moving-picture image data (52) based on said controlled filtering-operation parameters (34:39), whereby distortion-free moving-picture image data (54) is produced.

BRIEF DESCRIPTION OF THE DRAWINGS

For a better understanding of the present invention, reference is made to the following detailed descriptions in conjunction with the accompanying drawings, in which:

FIGS. 20A and 20B illustratively explain two parameters 32 and 34 produced in the eighth image processing apparatus 2000;

FIG. 21 shows an internal circuit arrangement of the second parameter-vibration suppressing unit 2555 employable in the eighth image processing apparatus 2000; and FIG. 22 schematically shows the counting contents of the down counter 2300 under the loading state employed in the parameter-vibration suppressing unit 2555.

DESCRIPTION OF THE PREFERRED EMBODIMENTS

Basic Ideas

Roughly speaking, the present invention has been mainly constructed based upon two basic ideas.

A first feature of an image processing apparatus according to the present invention is as follows. While coding/decoding distortions are removed by employing a recursive type filter in which pixel values of image data whose coding/decoding distortions have been, in principle, removed are used, such a pixel variation amount having at least one local maximum value and one local minimum value has been previously stored in a memory, and this pixel variation amount is read out therefrom by a variation amount controlling means in response to differences in pixel values between a pixel to be processed and pixels to be referred.

A second feature of the image processing apparatus according to the present invention is as follows. In the second image processing apparatus, variations in parameters for strengthening a filtering operation of a distortion removing filter are continuously performed, whereas variations in parameters for weakening the filtering operation thereof are executed after a predetermined time period has passed.

Arrangement/Operation of First Image Processing Apparatus

Figure 4:
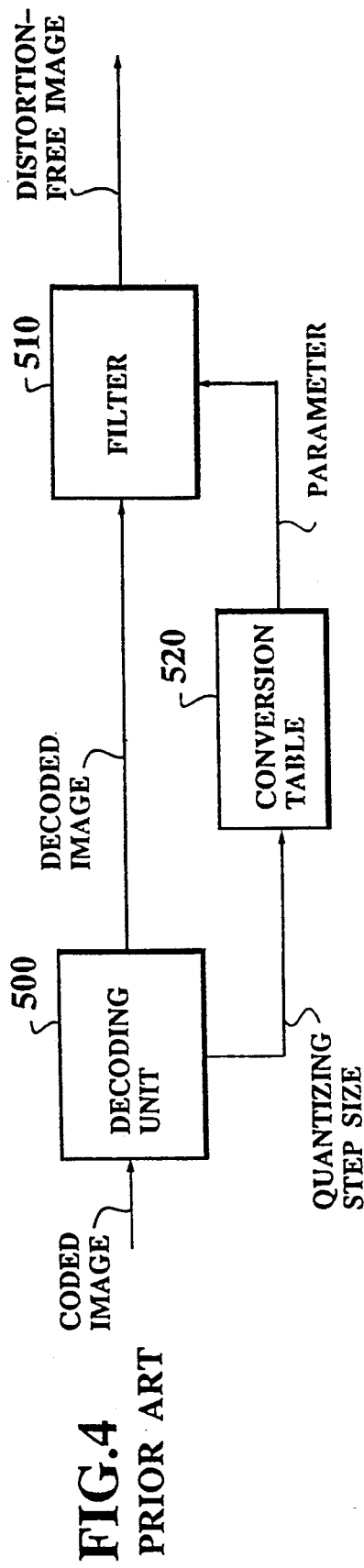
FIG. 4 is a schematic block diagram for showing a circuit arrangement of another conventional image processing method.
Figure 5:
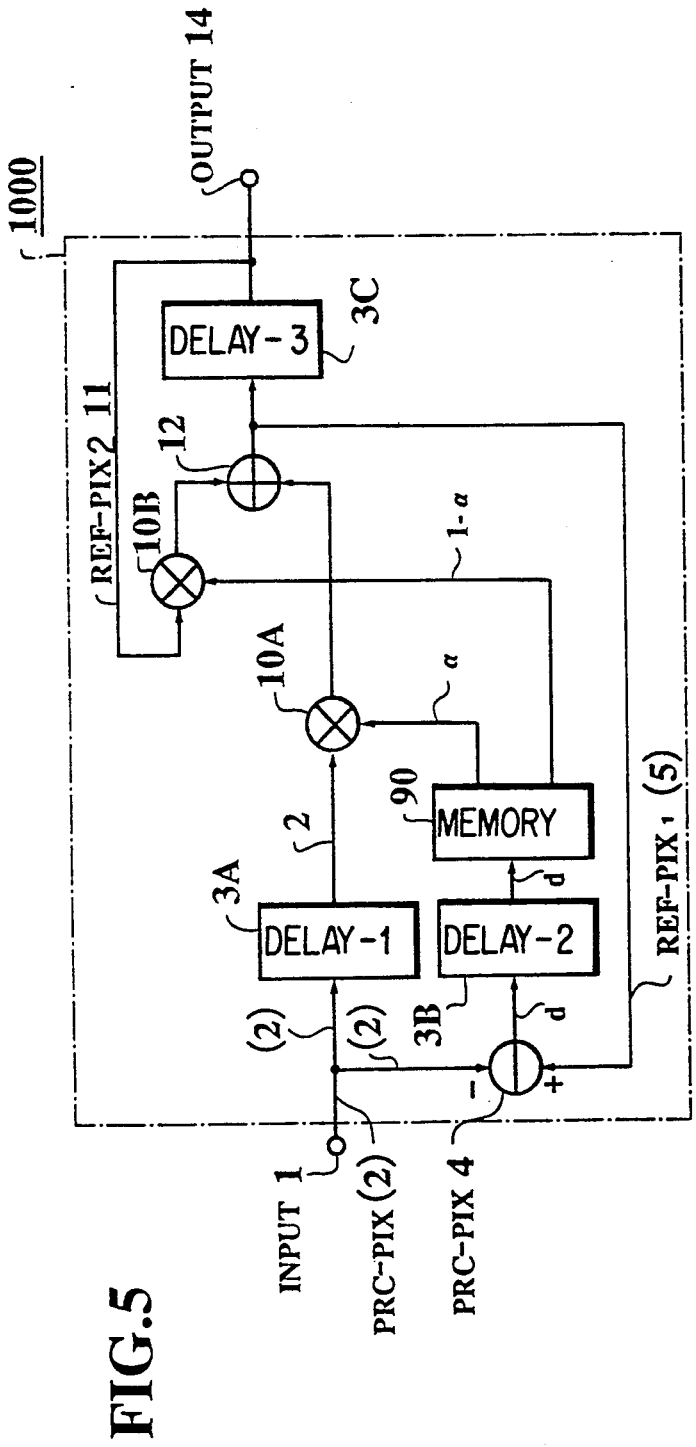
FIG. 5 is a schematic block diagram for representing a circuit arrangement of an image processing apparatus 1000 according to a first preferred embodiment of the present invention.

FIG. 5 represents an image processing apparatus 1000 according to a first preferred embodiment of the present invention. This first image processing apparatus 1000 has been realized based on the above-described first basic idea. Roughly speaking, the major circuit of the first image processing apparatus 1000, except for a memory unit 90, corresponds to the conventional distortion removing filter 510 shown in FIG. 4. A present processed pixel value (PRC-PIX) 2 is supplied from an input terminal 1 into this first image processing apparatus 1000. That is, this present processed pixel value 2 is temporarily stored into a first delay unit 3A. It should be understood that since the present processed pixel value 2 has been coded/decoded, this pixel value 2 contains coding/decoding distortions therein.

On the other hand, this present processed pixel value 2 is also supplied to a subtractor 4. In this subtractor 4, the present processed pixel value 2 is subtracted from a first reference pixel value (REF-PIX$_1$) 5 from which the coding/decoding distortion has been removed at one previous step. The subtraction result "d", namely a difference between the present processed pixel value 2 and the first reference pixel value 5 is temporarily stored in a second delay unit 3B. these first and second delay units 3A and 3B are employed in order to control the input timings of these pixel values to a first multiplier 10A (will be discussed later).

A memory unit 90 is connected to the second delay unit 3B. From this memory unit 90, both "$\alpha$" and "$1-\alpha$" are read out based on the difference "d" between the processed pixel value 2 and the first reference pixel value 5, which is outputted from the second delay unit 3B. It should be noted that "$\alpha$" corresponds to a coefficient of weighted average and satisfies condition 1 as follows.

$$0 < \alpha < 1 \qquad (1).$$

In other words, "$\alpha$" is intentionally determined by the difference in the pixel values "d".

Then, the first coefficient "a" is multiplied with the present processed pixel value 2 in the first delay unit 3A, whereas the second coefficient "$1-\alpha$" is multiplied with a second reference pixel value (REF-PIX$_2$) 11. Both of the multiplication results from the first and second multipliers 10A and 10B are added with each other in an adder 12. The adding result from this adder 12 is temporarily stored in a third delay unit 3C, which will be then derived from an output terminal 14 of this first image processing apparatus 1000 as a desirable pixel value from which the coding/decoding distortion has been completely removed. That is to say, the present processed pixel value containing the coding/decoding distortion is processed in this first image processing apparatus 1000 in accordance with the above-described distortion removing method, so that the desirable distortion-free pixel value can be derived therefrom via the output terminal 14. As is apparent from FIG. 5, the adding result derived from the adder 12 is also used as the first reference pixel value, and furthermore the desirable pixel value temporarily stored in the third delay line 3C is used as the second reference pixel value 11.

It should also noted that the coefficient "$\alpha$" may preferably be an increasing function with respect to the subtracted pixel value "d". As this example, FIG. 6 represents the following increasing function:

$$\alpha(d) = (d^2 + 100)/(d^2 + 200) \qquad (2).$$

Figure 6:
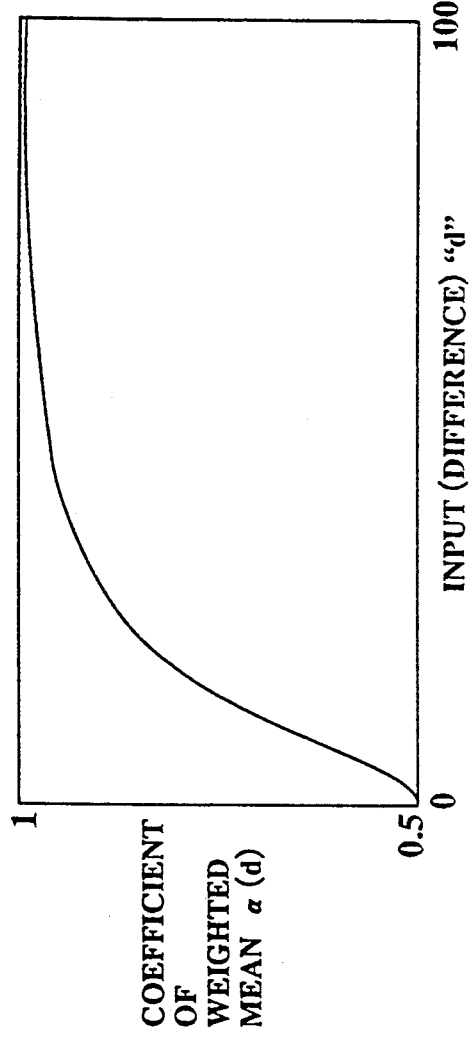
FIG. 6 graphically represents a relationship between coefficient of weighted mean and pixel difference of the first image processing apparatus 1000.

In the example of FIG. 6, when the difference "d" between the present processed pixel value and the reference pixel value is equal to 0, no weighting operation is carried out for both pixel values by setting: $\alpha = 0.5$. Also, the larger the difference "d" becomes, the more the weighted pixel value is utilized. That is to say, symbol $\alpha(d)$ corresponds to a coefficient of weighted means, and therefore the variation amount of the pixel may be controlled by changing this coefficient $\alpha(d)$. The variation amount is used for removing the coding/decoding distortion.

Internal Arrangement of Memory Unit 90

Figure 7:
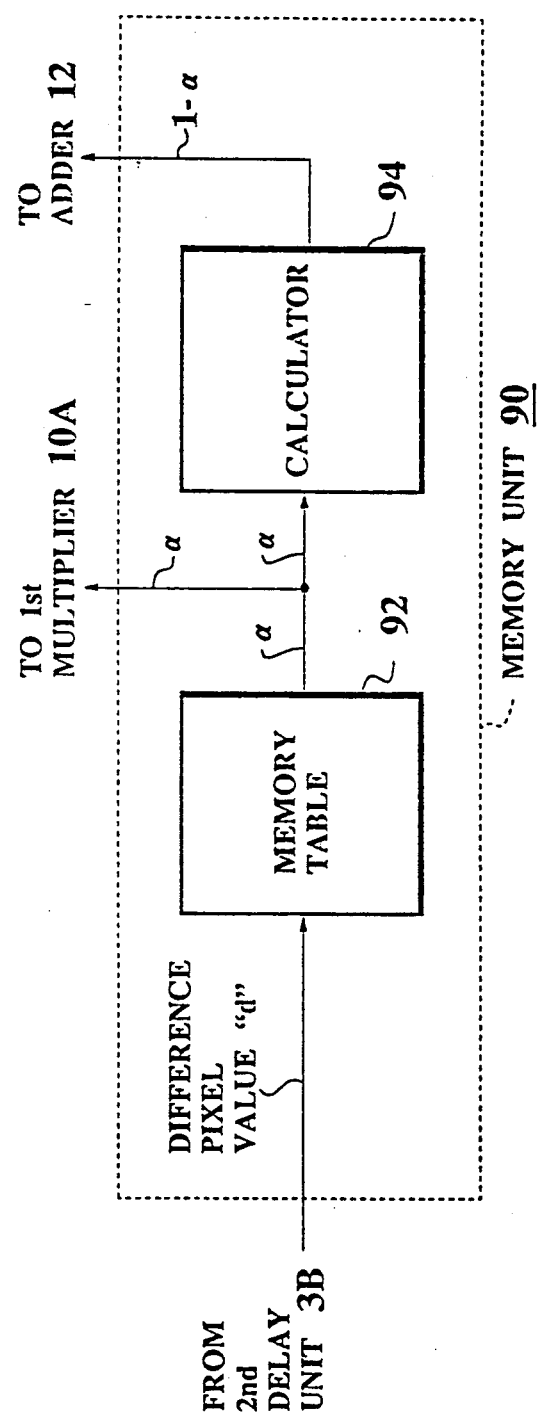
FIG. 7 is a schematic block diagram of an internal circuit of the memory unit 90.

Referring now to FIG. 7, an internal arrangement of the memory unit 90 will be described. This memory unit 90 includes a memory table 92 and a calculator 94. Upon receipt of the difference pixel value "d" from the second delay unit 3B, the first coefficient of the weighted average "$\alpha$" is read out from the memory table 92. Then, the first coefficient of the weighted average "$\alpha$" is, on one hand, supplied to the first multiplier 10A, and on the other hand, to the calculator 94. In this calculator 94, a predetermined calculation is performed, whereby the second coefficient of weighted average $(1-\alpha)$ is obtained. The second coefficient is furnished to the adder 12.

Figures 8, 9:
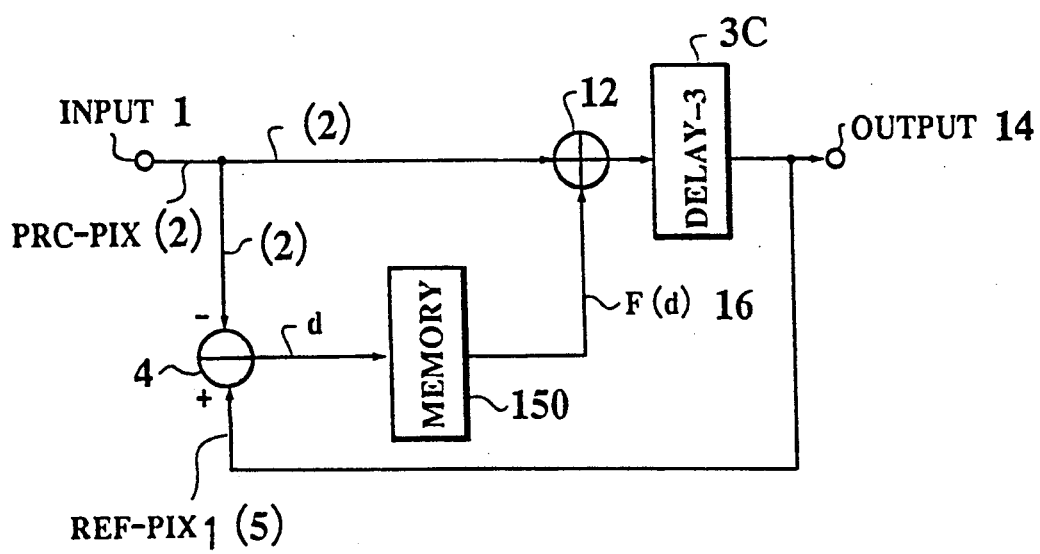
FIG. 8 represents the content of the memory table 92.
FIG. 9 is a schematic block diagram of an image processing apparatus 1100 according to a second preferred embodiment of the present invention.

FIG. 8 shows one example of contents of the memory table 92. As apparent from the contents of this memory table 92, while the difference pixel value "d" is varied from $+255$ to $-255$, the first coefficient "$\alpha$" is changed from 1 to 0, which surely satisfies the above-described condition (1). Accordingly, the second coefficient $(1-\alpha)$ is similarly varied from 1 to "0".

Figure 12:
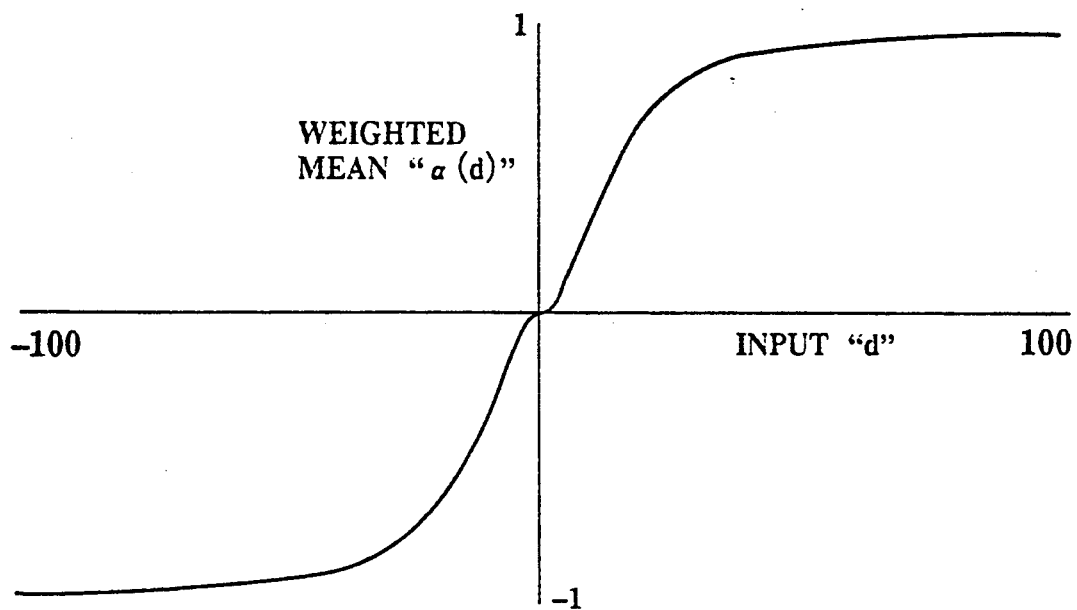
FIG. 12 graphically represents another relationship between the coefficient of weighted means and the pixel difference.
Figure 13:
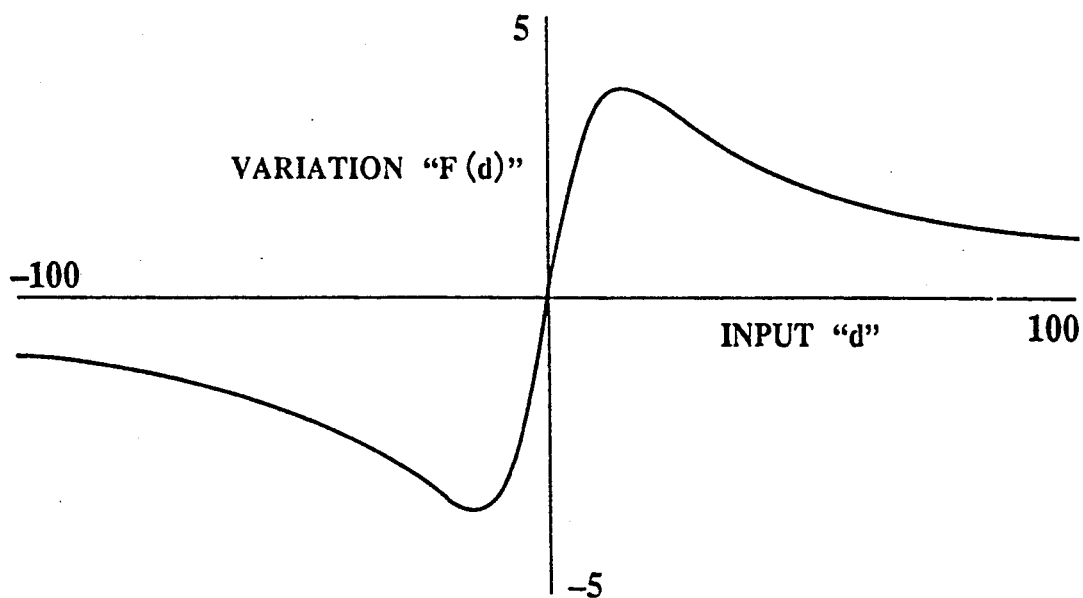
FIG. 13 graphically represents another relationship between the variation amount and the pixel difference.

In accordance with the above-described first to third image processing apparatuses 1000 to 1200, as represented in FIGS. 12 and 13, the coefficients of weighted mean $\alpha(d)$ may be controlled over all of the differences between the processed pixel values 2 and the first reference pixel values 5. Furthermore, the weighting operation may be varied, depending upon the comparison results between the processed pixel value 2 and the first reference pixel 5. This average difference is added as a bias value 21 to the distortion-free pixel signal 19, thereby producing a mean-reserved pixel signal 22. As a consequence, the average values before and after the distortion removing operation can be reserved. Then, the mean-reserved pixel signal 22 may be directly outputted, or may be further processed.

Arrangement/Operation of Second Image Processing Apparatus

FIG. 9 represents an overall arrangement of an image processing apparatus 1100 according to a second preferred embodiment. This second image processing apparatus 1100 has been realized based on the first basic idea, and has the similar processing operation to that of the first image processing apparatus 1000. It should be noted that the same reference numerals shown in FIG. 5 will be employed as those for denoting the same or similar circuit elements in the following drawings.

As readily seen from FIG. 9, the feature of this second image processing apparatus 1100 is such that when the difference "d" between the present processed pixel memory unit 150, a variation amount (F(d)) 16 of the memory unit 150, a variation amount (F(d)) 16 of the processed pixel (i.e., the coded input pixel signals 2) can be directly read out from this memory unit 150. As a consequence, a desirable distortion-free pixel value can be derived from the output terminal 14 by simply adding this variation amount 16 to the present processed pixel value 2 in the adder 12.

Assuming now that the variation amount (F(d)) 16 is defined as follows:

$$F(d) = d/(d^2 + 200) \quad (3),$$

then the same distortion-free pixel value as shown in FIG. 5 can be obtained from the output terminal 14 of the second image processing apparatus 1100.

Content of Memory Unit 150

Figures 10A, 10B:
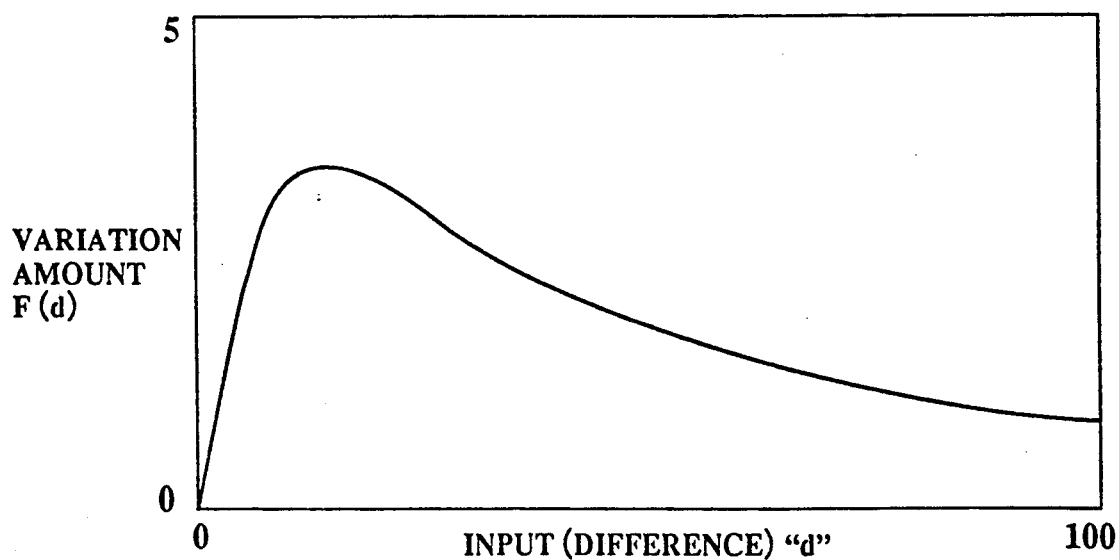
FIG. 10A shows the content of the memory table 150, and FIG. 10B graphically represents the relationship between variation amount and pixel difference of the second image processing apparatus 1100.

FIG. 10A shows the content of a memory table (not shown) in detail) constructing the memory unit 150, and FIG. 10B graphically represents a relationship between the variation amount F(d) and the input pixel value (namely, the difference pixel value) "d". As seen from FIGS. 10A and 10B, the input pixel value "d" is varied from $+255$ to $-255$, whereas the variation amount F(d) is changed from $+5$ to $-5$.

Arrangement/Operation of Third Image Processing Apparatus

Figure 11:
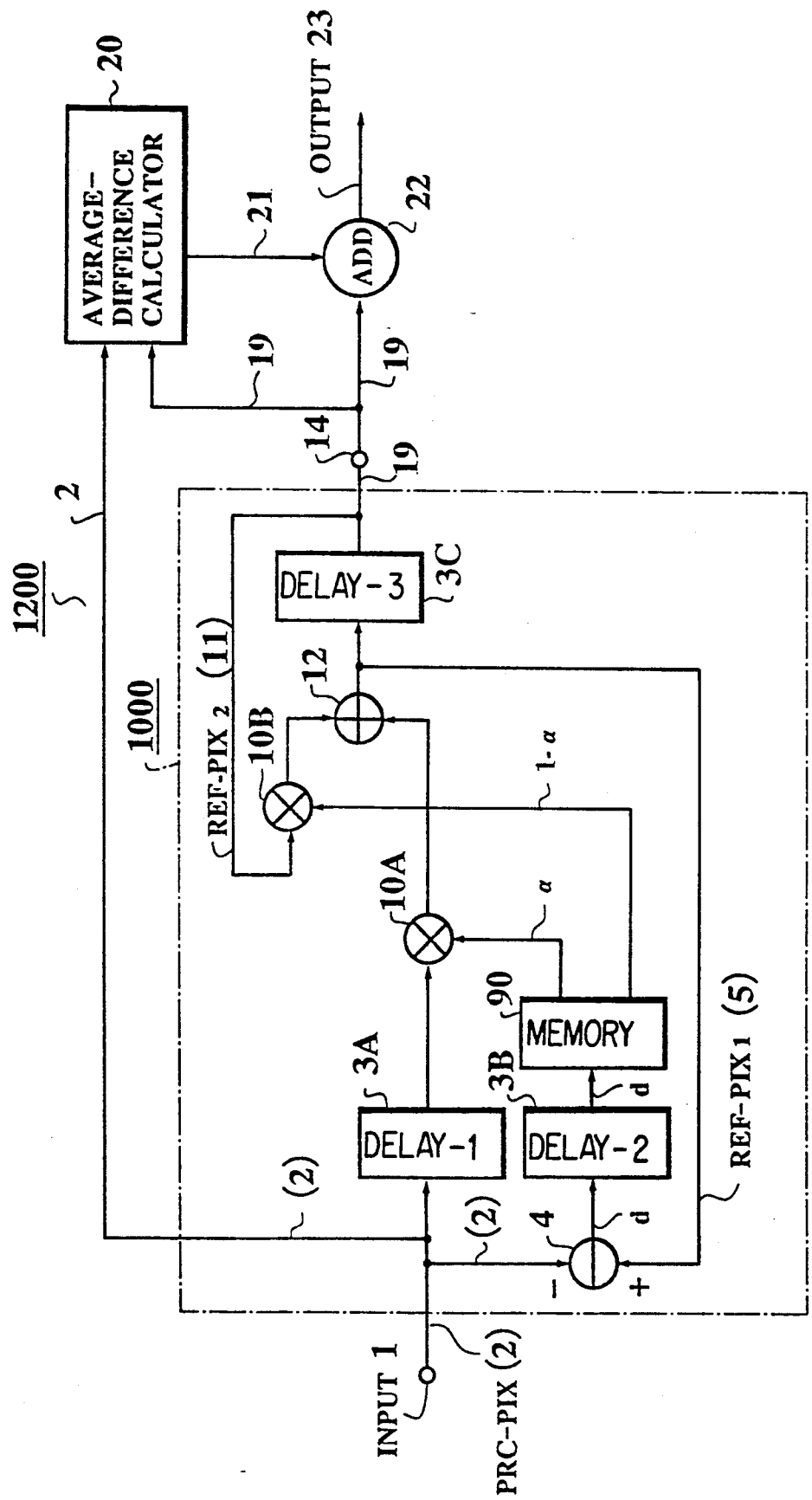
FIG. 11 is a schematic block diagram for showing an arrangement of an image processing apparatus 1200 according to a third preferred embodiment of the present invention.

FIG. 11 represents an entire arrangement of an image processing apparatus 1200 according to a third preferred embodiment of the present invention, and belonging to the first basic idea. A feature of the third image processing apparatus 1200 is in that to solve such a problem that the average values of the pixels cannot be maintained while removing the coding/decoding distortion in the first image processing apparatus 1000, an average-difference calculator 20 and a second adder 22 are employed in combination with the first image forming apparatus (distortion removing filter) 1000.

In the third image processing apparatus 1200, since the distortion removing operation by the first image processing apparatus 1000 has been explained, only the average-value maintaining operation will now be described. Both the present processed pixel signal 2 (signal containing the coding/decoding distortion) and the distortion-free pixel signal 19 derived from the first adder 12 through the third delay unit 3C are inputted into the average-difference calculator 20. Thus, the difference between average values of these pixel signals 2 and 19 is obtained. Thereafter, this average difference is added in an adder 22 as a bias value 21 to the distortion-free pixel signal 19, thereby producing a mean-reserved pixel signal 23. As a consequence, the average values of both the processed pixel signal 2 and the distortion-free pixel signal 19 before and after the distortion removing operation can be reserved. Then, the mean-reserved pixel signal 23 may be directly outputted, or may be further processed.

It should be noted that the above-described average-difference reserving arrangement 20, 22 may be additionally applied to other image processing apparatuses, for instance, 1300 and 1400.

In accordance with the above-described first to third image processing apparatuses 1000 to 1200, as represented in FIGS. 12 and 13, the coefficients of weighted mean $\alpha(d)$ may be controlled over all of the differences between the processed pixel values 2 and the first reference pixel values 5. Furthermore, the weighting operation may be varied, depending upon the comparison results between the processed pixel value 2 and the first reference pixel 5.

Other Image Processing Apparatuses Belonging to First Basic Idea

Figure 14:
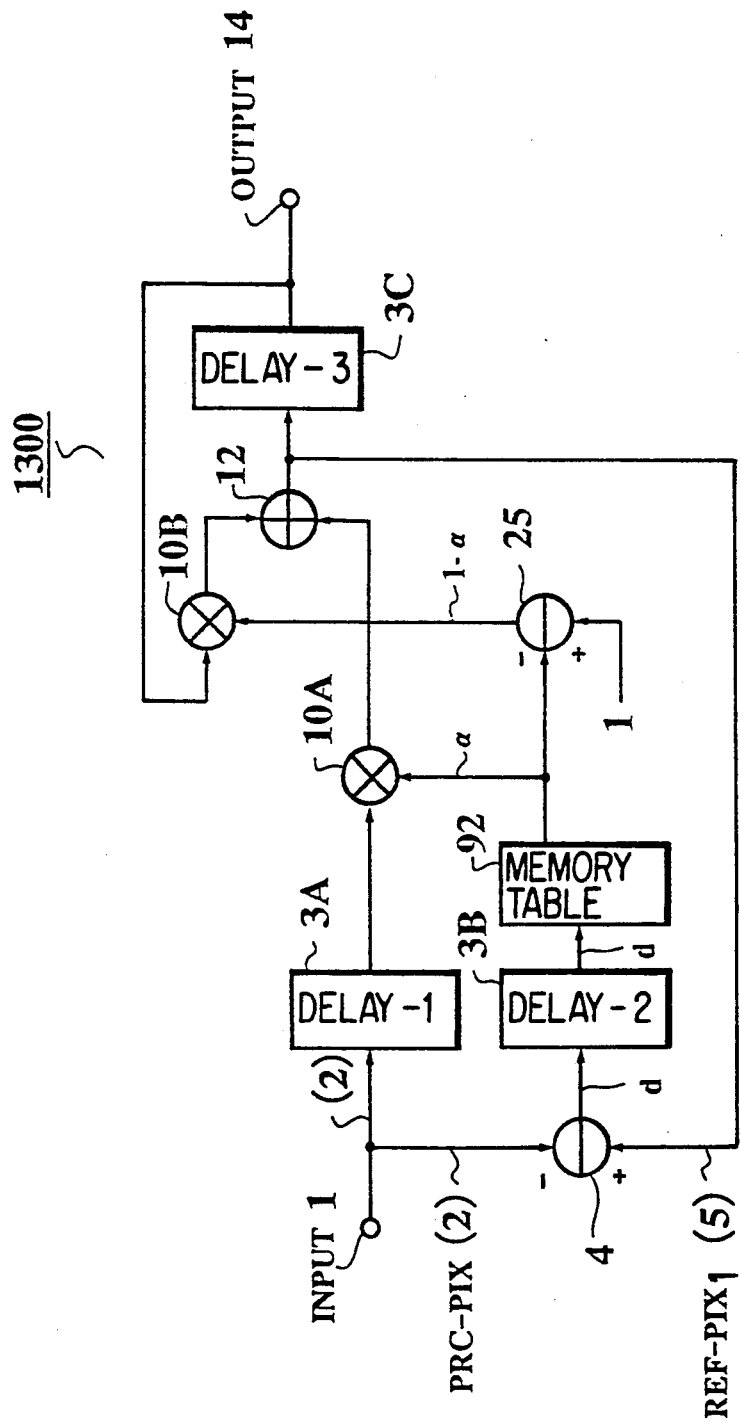
FIG. 14 is a schematic block diagram for showing an image processing apparatus 1300 according to a fourth preferred embodiment of the present invention.

FIG. 14 represents an arrangement of an image processing apparatus 1300 according to a fourth preferred embodiment of the present invention. In this fourth image processing apparatus 1300, the memory table 92 and a second subtractor 25 are connected "$\alpha$" and "1" are inputted into this second subtractor 25, so that the second coefficient "$1-\alpha$" is derived therefrom. If both the first subtractor 4 and the second subtractor 25 are commonly used, and also the subtraction between the reference pixel value 5 and the processed pixel value 2 is selectively controlled by way of a switch (not shown in detail), a more compact image processing apparatus may be obtained.

Figure 15:
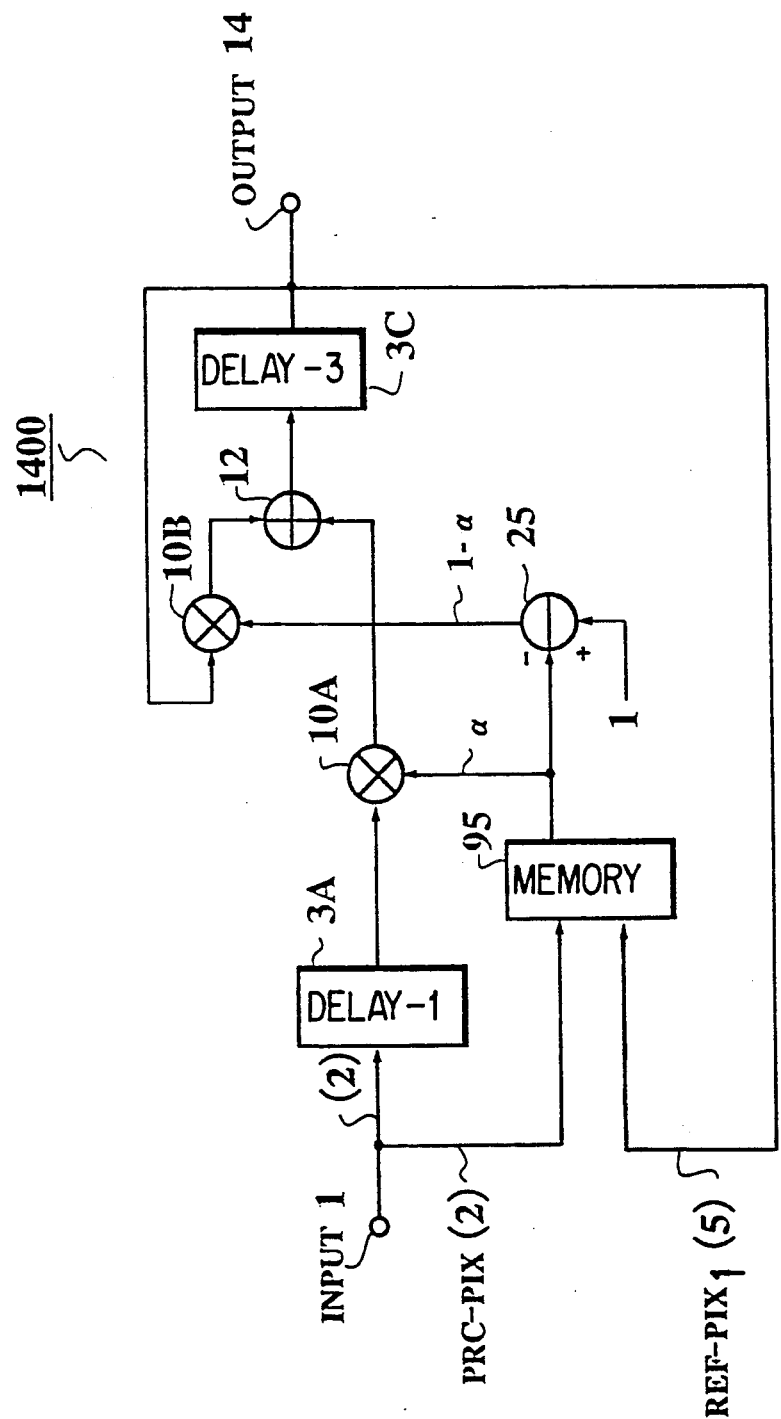
FIG. 15 is a schematic block diagram for representing an image processing apparatus 1400 according to a fifth preferred embodiment of the present invention.

FIG. 15 shows an arrangement of an image processing apparatus 1400 according to a fifth preferred embodiment of the present invention. In this fifth image processing apparatus 1400, both the present processed pixel value 2 and the reference pixel value 5 are directly entered into a memory unit 95. With such an arrangement, the first coefficient "α" is not limited to the function of the difference between the processed pixel value 2 and the reference pixel value 5, but may be determined by employing as independent variables both the processed pixel value 2 and the reference pixel value 5.

Figure 16:
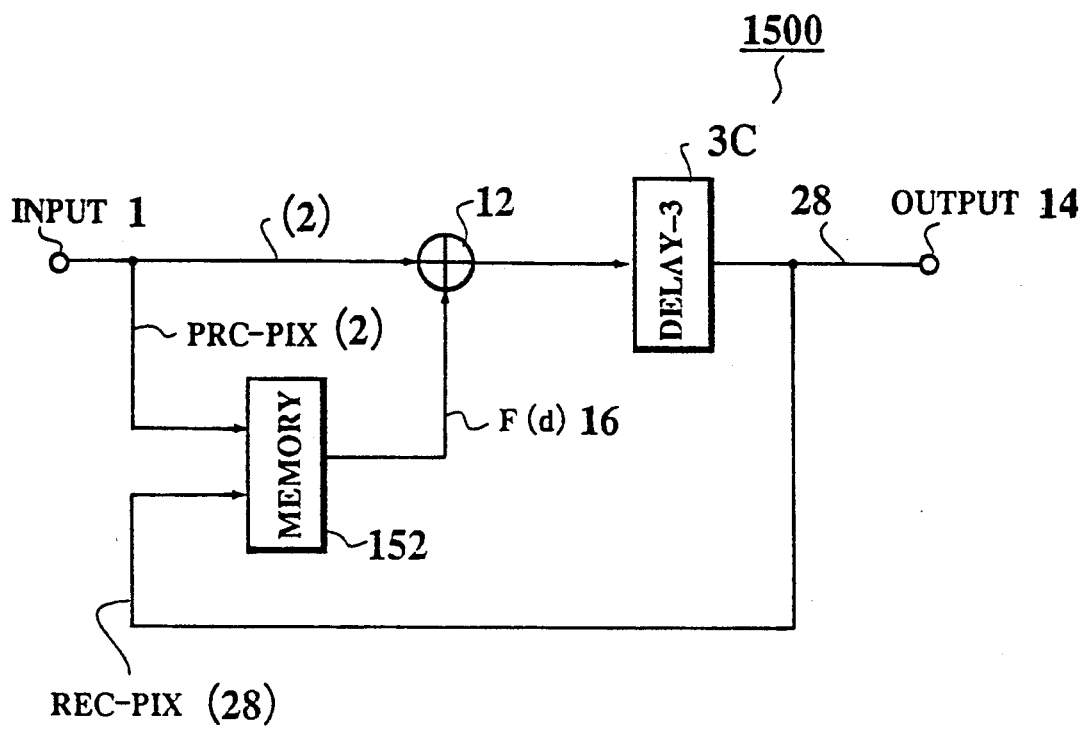
FIGS. 16 and 17 show arrangements of other image processing 1500 and 1600 accomplished by the first basic idea of the present invention.
Figure 17:
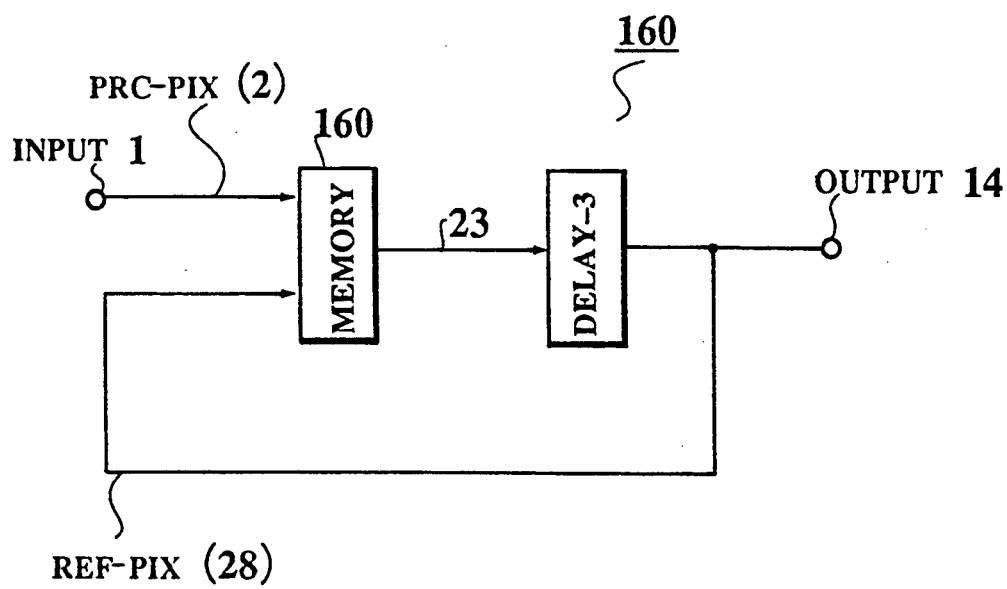

Furthermore, FIG. 16 shows an arrangement of an image processing apparatus 1500 according to a sixth preferred embodiment of the present invention, and FIG. 17 represents an arrangement of an image processing apparatus 1600 according to a seventh preferred embodiment of the present invention.

In the sixth image processing apparatus 1500, upon receipt of both the processed pixel value 2 and the reference pixel value 28, a memory unit 152 outputs the variation amount (F(d)) 16. Then, this variation amount 16 is added to the processed pixel value 2 in the adder 12, whereby the desirable distortion-free pixel value 28 can be produced. This desirable distortion-free pixel value 28 is also used as the reference pixel value (REF-PIX) to the memory unit 152.

In contrast to the sixth image processing apparatus 1500, the seventh image processing apparatus 1600 is constructed of a memory 160 and the delay unit 3C. From this memory unit 160, the desirable distortion-free pixel value 28 can be directly obtained.

Figure 1:
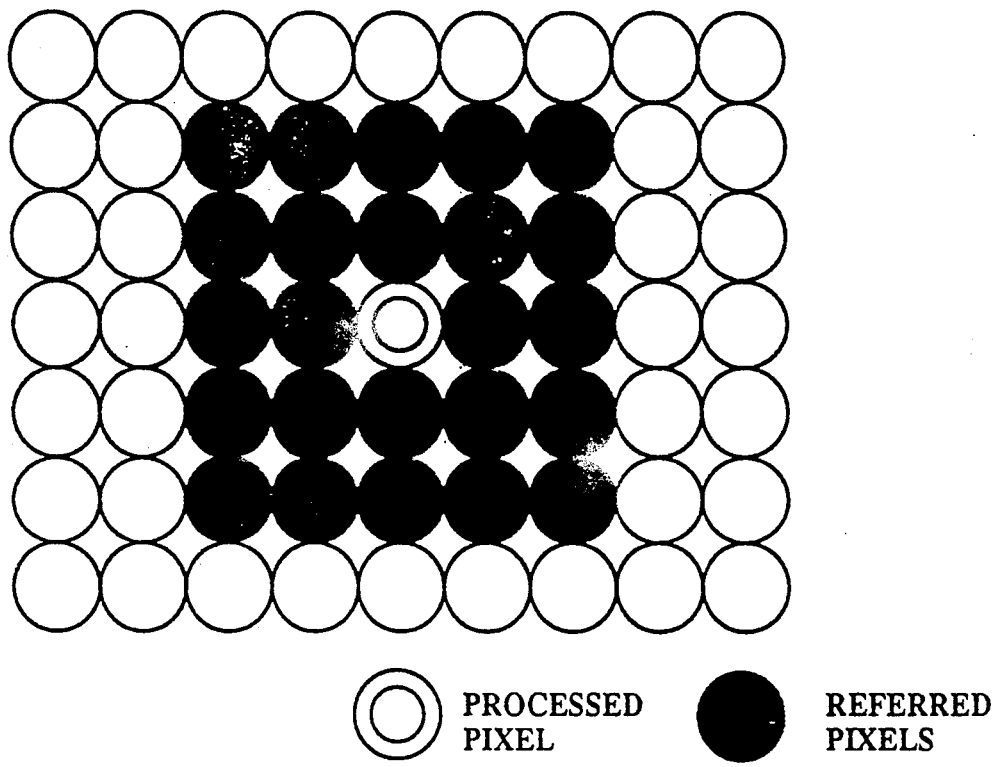
FIGS. 1 and 2 are illustrations of image pixel regions for explaining one conventional pixel-value processing (i.e., distortion removing) method.
Figure 2:
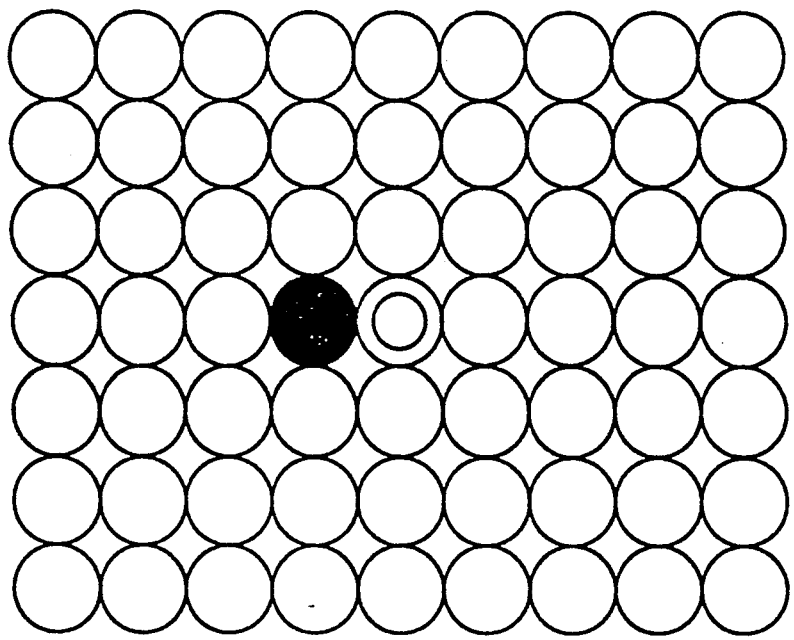
Figure 3A:
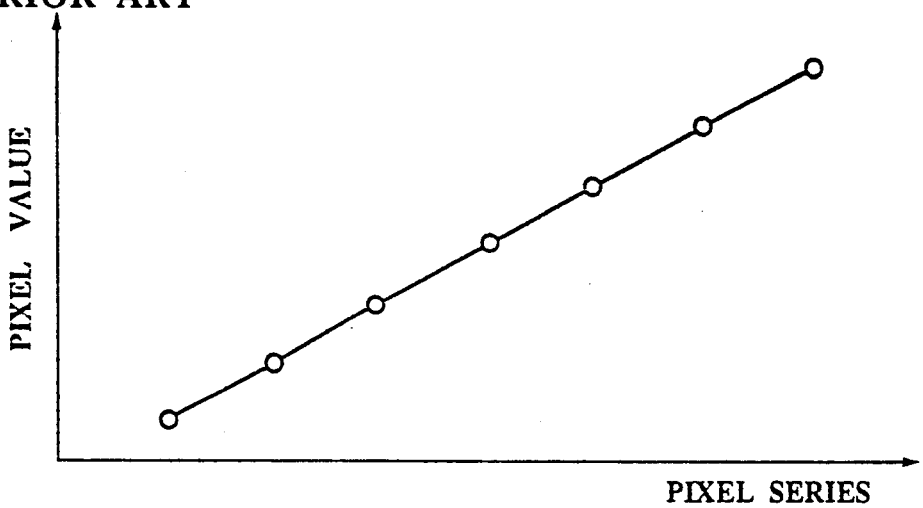
FIGS. 3A and 3B are graphic representations for explaining another conventional distortion removing method and FIG. 3C is a graphic representation for explaining the first basic idea according to the present invention.
Figure 3B:
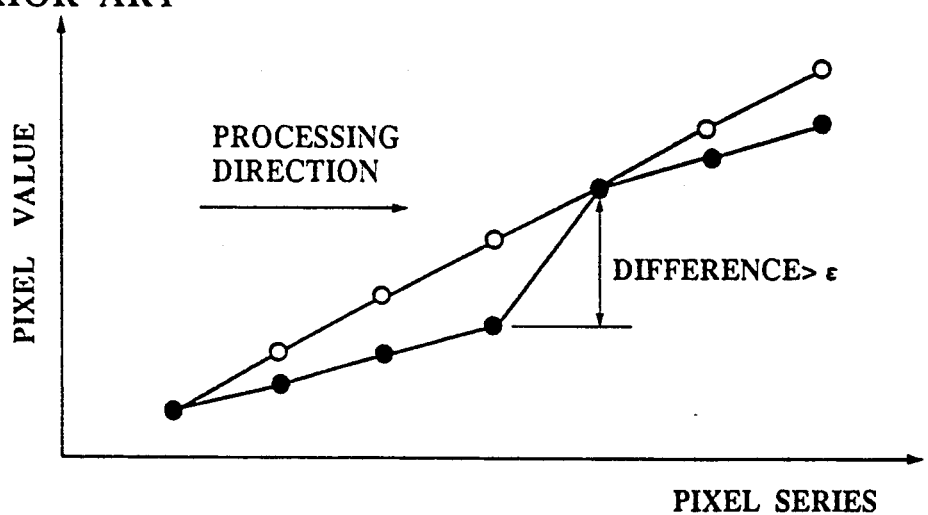
Figure 3C:
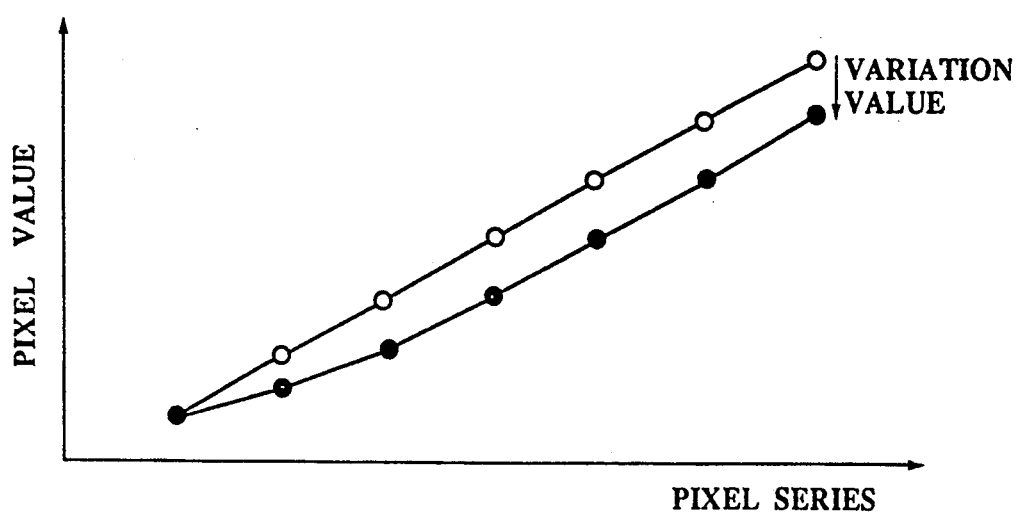

As previously described in detail, according to the image processing apparatus 1000 to 1600 belonging to the first basic idea, it is so designed that the larger, the differences between the processed pixels containing the coding/decoding distortion and the reference pixels become, the greater the weighting coefficients for these processed pixels become. Accordingly, whenever the pixel series as shown in FIG. 3A are inputted via the input terminal 1 to these image processing apparatuses 1000 to 1600, there is no problem that the variation amounts of the processed image pixels are increased greater and greater. In such an input condition, as shown in FIG. 3C, it is possible to approximate the inputted image pixel series to a certain constant variation value. As a consequence, it is possible to obtain the output image pixel series having the substantially the same incline as that of the input image pixel series.

Arrangement/Operation of Eighth Image Processing Apparatus

Figure 18:
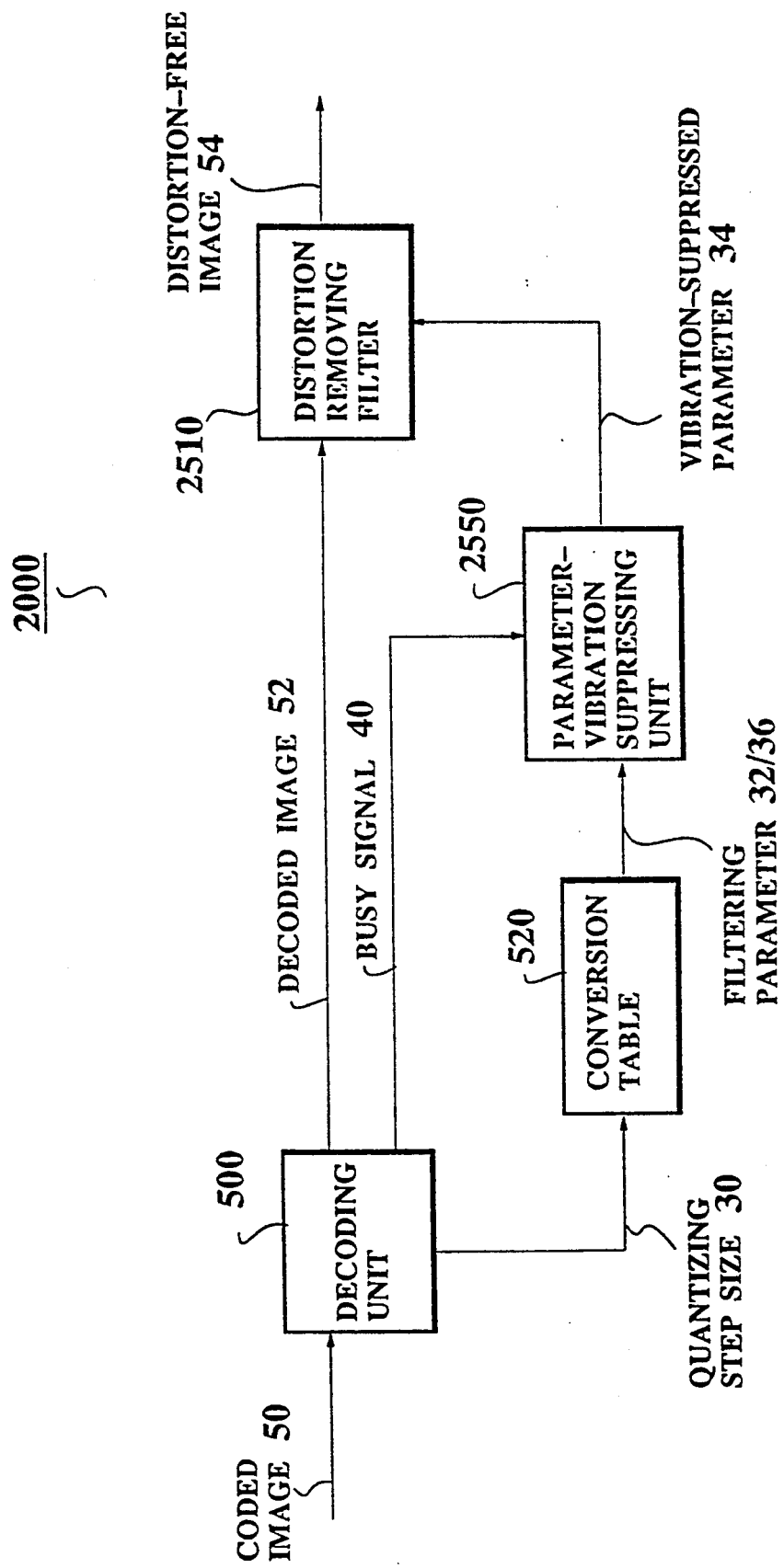
FIG. 18 is a schematic block diagram for showing an overall arrangement of an image processing apparatus 2000 according to an eighth preferred embodiment of the present invention, and accomplished by the second basic idea.

In FIG. 18, there is shown an overall arrangement of an image processing apparatus 2000 according to an eighth preferred embodiment and accomplished based upon the second basic idea.

The eighth image processing apparatus 2000 is mainly constructed of the above-described decoding unit 500 and the quantizing step size/parameter conversion table 520, and furthermore a distortion removing filter 2510 and a parameter-vibration suppressing unit 2550.

In the eighth image processing apparatus 2000, the coded image (pixel) data 50 is inputted into the decoding unit 500 so as to be converted into the decoded image data 52. Then, the decoded image data 52 is supplied to the distortion removing filter 2510. On the other hand, the quantizing step size 30 is also outputted from the decoding unit 500, which will be then supplied to the size/parameter conversion table 520. The filtering parameters 32 of this conversion table 520 are so determined that when the quantizing step size 30 becomes large, the filtering operation by the distortion removing filter 2510 is strengthened, whereas when the quantizing step size 30 becomes small, the filtering operation by the distortion removing filter 2510 is weakened.

The filtering parameters 32 from the conversion table 520 are supplied to the parameter-vibration suppressing unit 2550. Accordingly, the vibrations occurring in these filtering parameters 32 are suppressed by this parameter-vibration suppressing unit 2550, whereby vibration-suppressed parameters 34 are derived from this parameter-vibration suppressing unit 2550, and then supplied to the distortion removing filter 2510.

On the other hand, busy signals 40 are sent from the decoding unit 500 to the parameter-vibration suppressing unit 2550. The busy signals 40 were originally sent from the decoding unit 500 to the distortion removing filter 2510, while the coded image data were transmitted. Since, generally speaking, the image data are coded and transmitted in units of 1 frame, the number of frames can be recognized when the quantity of these busy signals 40 is counted. As a consequence, in this eighth image processing apparatus 2000, the parameter-vibration suppressing unit 2550 receives such busy signals 40 from the decoding unit 500 in order to perform time counting operation.

As previously described, since the decoded image data 52 is inputted into the distortion removing filter 2510 together with the vibration-suppressed parameter 34, the strengths of the filtering operation by the distortion removing filter 2510 are changed in response to the vibration-suppressed parameter 34 as will be discussed in greater in detail). Consequently, the distortion-free image data 54 can be produced from the distortion removing filter 2510.

Although not shown in detail in FIG. 18, this conversion table 520 functions as a memory for previously storing a plurality of filtering strength coefficients corresponding to the quantizing step sizes, and the filter removes the coding/decoding distortions contained in the decoded image 52 in accordance with the filter strength selected based on the vibration-suppressed parameter 34.

Internal Circuit Arrangement of Parameter-Vibration Suppressing Unit

Figure 19:
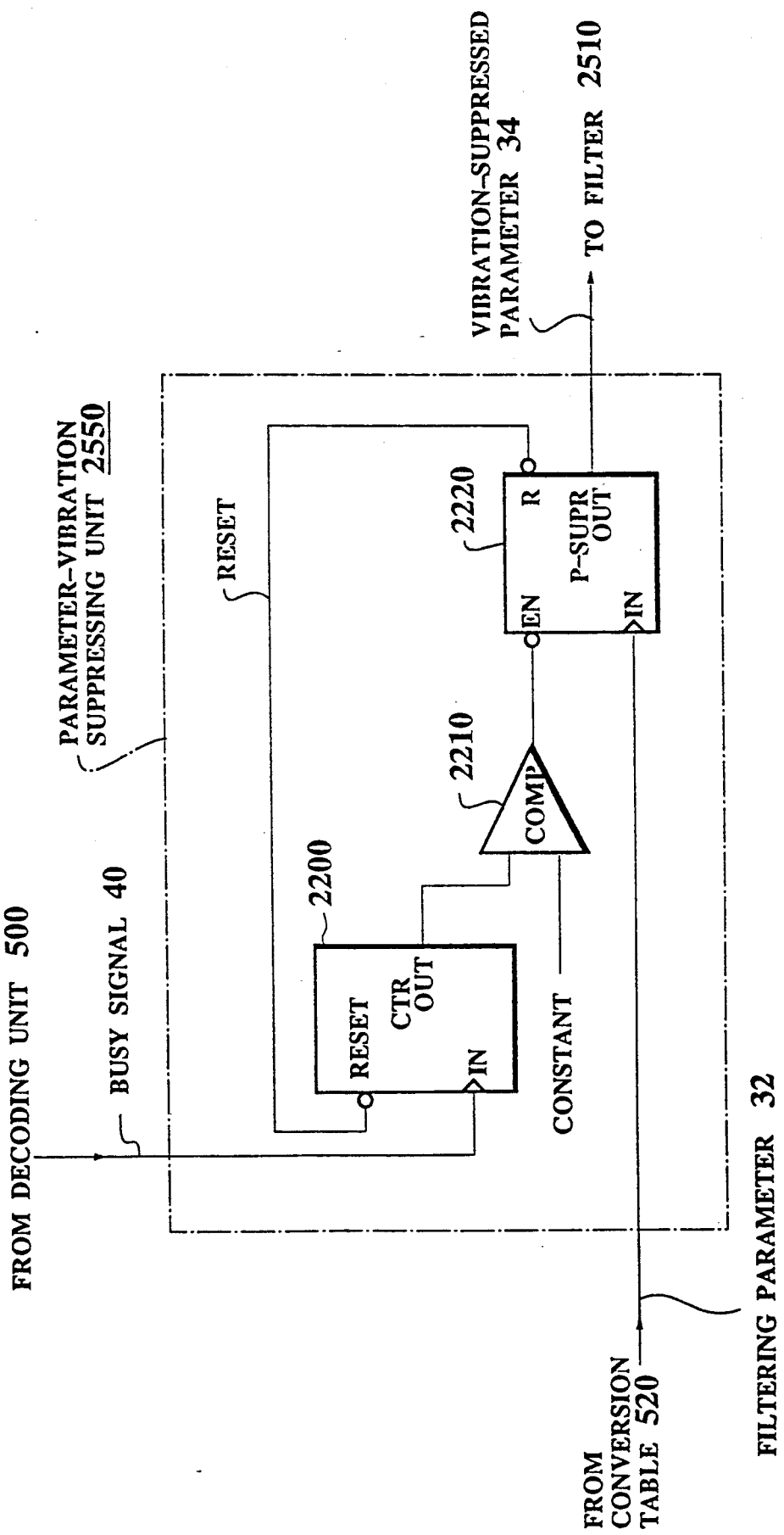
FIG. 19 shows an internal circuit arrangement of the first parameter-vibration suppressing unit 2550 employed in the eighth image processing apparatus 2000.

Referring now to FIG. 19, an internal circuit arrangement of the above-described parameter-vibration suppressing unit 2550 employed in the eighth image processing apparatus 2000.

As previously explained, each of the busy signals 40 is supplied from the decoding unit 500 to the parameter-vibration suppressing unit 2550 every 1 frame in this eighth image processing apparatus 2000.

In this first parameter-vibration suppressing unit 2550, the supply number of the busy signals 40 is counted by a counter 2200. The counted value of this counter 2200 is then compared with a constant in a comparator 2210. The comparison result of this comparator 2210 is supplied to an enable terminal "EN" of a parameter suppressor 2220. It is assumed in this embodiment that when the counted value is smaller than the constant, a high-level signal is outputted from the comparator, whereas when the counted value is larger than the constant, a low-level signal is outputted therefrom. The filtering parameter 32 derived from the conversion table 520 is furnished to an input terminal "IN" of the parameter suppressor 2220, and when the low-level comparison result signal is inputted into the enable terminal "EN" thereof, this furnished filtering parameter 32 is directly derived from the parameter suppressor 2220 via an output terminal "OUT" as the vibration-suppressed parameter 34. To the contrary, when the high-level comparison result signal is supplied into the enable terminal "EN", in case that such a filtering parameter 32 is inputted which may cause the filtering operation to be strengthened, as compared with the filtering effect by the present vibration-suppressed parameter 34, this newly inputted filtering parameter is directly derived from the parameter suppressor 2220. Conversely, if another filtering parameter 32 is inputted which may cause the filtering operation to be weakened, as compared with the filtering effect by the present vibration-suppressed parameter 34, the parameter suppressor 2220 ignores the presently inputted filtering parameter 32 and maintains the presently outputted vibration-suppressed parameter 34. Then, as described above, when the vibration-suppressed parameter 34 is changed, a reset signal is transmitted from the parameter suppressor 2220 through a reset terminal "RESET" of the counter 2200 to this counter 2200, whereby the count value is returned to zero. Assuming now that the above-described constant supplied to the comparator 2210 is selected to be 30, the output value (i.e., vibration-suppressed parameter 34) of the parameter suppressor 2220 is always changed if this output value 34 causes the filtering operation of the distortion removing filter 2510 to be strengthened. To the contrary, the output value 34 of the parameter suppressor 2220 is not changed if this output value 34 causes the filtering operation thereof to be weakened within 30 frames (1 to 3 seconds in the video phone communication system) since the output value 34 has recently been varied. If such a filtering parameter 34 for weakening the filtering operation by the distortion removing filter 2510 is continuously inputted into the parameter suppressor 2220, the filtering operation of the distortion removing filter 2510 is newly weakened after 30 frames have passed.

It should be noted that the distortion removing filter 2510 may be replaced by the above-described first to seventh image processing apparatuses 1000 to 1600. The reason why strengthening of the filtering operation is continuously allowed in this eighth preferred embodiment, is to quickly respond to intensive occurrences of the coding/decoding distortion.

Filtering Parameter/Vibration-Suppressed Parameter

FIG. 20A represents a parameter whose vibrations have not yet been suppressed, namely the filtering parameter 32 directly derived from the conversion table 520, whereas FIG. 20B indicates a parameter whose vibrations have been suppressed, namely the vibration-suppressed parameter 34 derived from the parameter suppressor 2220, with respect to the lapse of time. In the drawings, it is assumed that the constant is selected to be, for instance, 3, and then strengths of the filtering operations (i.e., dimension of variation amounts for pixels during the distortion removing operation) of the filter 2510 are varied into three steps (parameter value of 2: strong, parameter value of 1: medium; parameter value of 0: weak). As is apparent from FIGS. 20A and 20b, only when the output value of the parameter suppressor 220 has been maintained for more than the last three frames, this output value for causing the parameter value to be reduced is changed. For instance, the vibrations contained in the filtering parameter 32, which are indicated by *, have been suppressed.

Circuit Arrangement of Second Parameter-Vibration Suppressing Unit

FIG. 21 represents a circuit arrangement of a second parameter-vibration suppressing unit 2555 which is used to substitute the first-mentioned parameter-vibration suppressing unit 2550 shown in FIG. 18. It is assumed that a filtering parameter 36 of this embodiment is constructed of 2 bits. First, this 2-bit filtering parameter 36 is inputted into a first input "A" of a seleactor 2320 and also a 7-bit down counter 2300, respectively. Then, when this 2-bit parameter 36 is loaded on the down counter 2300 upon instruction of a load signal 38. As shown in FIG. 22, this filtering parameter 32 is stored at the upper 2 bits (i.e., MSB and the second MSB) of the down counter 300 and the remaining 5 bits of this down counter 300 are set to high (1) levels under loading state. The count value of this down counter 2300 is decremented by 1 in units of the busy signal 40. The upper 2 bits of this down counter 2300 are inputted into a second input "B" of this selector 2320. On the other hand, the filtering parameter 36 is compared with an output value (upper 2 bits) of the down counter 2300 in a comparator 2310. The larger input value between the compared input values is used as a select signal 38 for the selector 2320. At this time, when the filtering parameter 36 is greater than the output value of the down counter 2300, a signal to be loaded 38 is sent to the down counter 2300.

The parameter-vibration suppressing operation by the second suppressing unit 2555 is as follows. First, the comparator 2310 outputs a low-level comparison signal when the filtering parameter 36 is greater than the output from the down counter 2300. The comparator 2310 outputs a high-level comparison signal when the filtering parameter 36 is equal to, or smaller than the output from the down counter 2300. The selector 2320 selects the filtering parameter 36 when the select signal 38 is a low-level signal, and selects the output from the down counter 2300 when the select signal 38 is a high level signal. If the down counter 2300 is set to be loaded while the load signal becomes low, the parameter-vibration suppressing operation may be realized by commonly using the output signal from this comparator 2310 as the select signal and load signal.

With such circuit arrangements, when the filtering parameter 36 becomes large, this parameter 36 is directly outputted from the selector 2320 as a 2-bit vibration-suppressed parameter 39. To the contrary, when this filtering parameter 36 becomes small, the 2-bit vibration-suppressed parameter 39 is varied only when more than 32 frames (because 5 bits data are set in the down counter 2300 as shown in FIG. 22) have passed after the latest vibration-suppressed parameter 39 has been changed. As a consequence, ten variations in the 2-bit filtering parameter 36 can be suppressed in the similar manner to that of the first parameter-vibration suppressing unit 2550 shown in FIG. 19.

While the present invention has been described in detail, according to the image processing apparatuses accomplished by the first and second basic ideas, when the coding/decoding distortions are removed, no new distortion happens to occur, but the satisfactory distortion removing operations can be realized. Obviously, numerous modifications and variations of the present invention are possible in light of the above teachings. It is therefore to be understood that, within the scope of the appended claims, the invention may be practiced otherwise than as specifically described herein.

What is claimed is:

1. An image processing apparatus comprising:

memory means for previously storing plural coefficients of variation amounts for pixel values of coded input image data;

subtraction means for performing a subtraction between the pixel value of said coded input image data and a pixel value of reference image data to obtain a difference pixel value, said reference image data being obtained from distortion-free image data acquired during one image-data processing cycle before a present image-data processing cycle for said coded image data; and, means for removing a coding/decoding distortion contained in said coded input image data by processing said pixel value of the coded image data base upon said coefficients read out from said memory means in response to said difference pixel value, whereby distortion-free input image data is produced.

2. An image processing apparatus as claimed in claim 1, further comprising:

means for calculating a difference in average values of said distortion-free input image data and of said coded input image data to obtain an average-difference signal; and, a second adder for adding said average-difference signal to said distortion-free input image data, whereby the average values for both said coded input image data and said distortion-free image data are reserved.

3. An image processing apparatus as claimed in claim 1, wherein said memory means includes:

a memory table for previously storing at least one local maximum coefficient and one local minimum coefficient.

4. An image processing apparatus as claimed in claim 3, wherein at least a first coefficient and a second coefficient are read out from said memory table upon receipt of said difference pixel value.

5. An image processing apparatus comprising:

memory means for previously storing plural coefficients of variation amounts for pixel values of coded input image data, and for outputting at least one of said coefficients as a first coefficient in response to both said coded input image data and reference image data, said reference image data being obtained from distortion-free image data acquired during one image-data processing cycle before a present image-data processing cycle for said coded image data;

coefficient calculator means for calculating a second coefficient based upon both said first coefficient and a constant; and, means for removing a coding/decoding distortion contained in said coded input image data by processing said coded input image data based upon said first and second coefficients, whereby distortion-free input image data is produced.

6. An image processing apparatus comprising:

memory means for previously storing a plurality of variation amounts with respect to pixel values of coded input image data;

subtraction means for performing a subtraction between the pixel value of said coded input image data and a pixel value of reference image data to obtain a difference pixel value, said reference image data being obtained from distortion-free image data acquired during one image-data processing cycle before a present image-data processing cycle for said coded input image data; and, means for removing a coding/decoding distortion contained in said coded input image data by processing said pixel value of the coded input image data based upon one of said variation amounts selected in response to said difference pixel value, whereby a distortion-free input image data is produced.

7. An image processing apparatus as claimed in claim 6, wherein said distortion removing means comprises an adder for adding said selected variation amounts to said coded input image data.

8. An image processing apparatus comprising:

memory means for previously storing a plurality of variation amounts for pixel values of coded input image data, and for outputting one of said variation amounts in response to both said coded input image data and reference image data, being said reference image data obtained from distortion-free image data acquired during one image-data processing cycle before a present image-data processing cycle for said coded image data; and, means for removing a coding/decoding distortion contained in said coded input image data by processing said pixel value of the coded input image data based upon said one of the variation amounts selected in response to both said coded input image data and the reference image data; whereby distortion-free input image data is produced.

9. An image processing apparatus as claimed in claim 8, wherein said distortion removing means comprises an adder for adding said selected variation amount to said coded input image data.

10. An image processing apparatus comprising:

memory means for previously storing plural pixel values of coding/decoding distortion-free image data and for outputting one of said pixel values of coding/decoding distortion-free image data in response to both coded input image data and reference image-data, said reference image data being obtained from distortion-free image data acquired during one image-data processing cycle before a present image-data processing cycle for said coded input image data; and, delay means for delaying said one of the coding/decoding distortion-free image data so as to obtain desirable distortion-free image data and said reference image data.

11. An image processing apparatus comprising:

decoding means for decoding pixel values of input image data coded in quantizing step sizes corresponding to the pixel values thereof to obtain at least decoded image data and the quantizing step sizes thereof;

memory means for previously storing a plurality of filtering-operation parameters corresponding to said quantizing step sizes;

parameter controlling means for controlling readout of said filtering-operation parameters from said memory means to obtain controlled filtering-operation parameters in such a manner that when said filtering-operation parameters are increased, said parameter reading operation is continuously performed, whereas when said filtering-operation parameters are decreased, said parameter reading operation is performed after a predetermined time period has passed; and, distortion removing means for removing a coding/decoding distortion form said decoded image data based on said controlled filtering-operation parameter read out from said memory means, whereby distortion-free image data is obtained.

12. An image processing apparatus as claimed in claim 11, wherein said decoding means includes means for producing busy signals by decoding said coded image data, and said parameter controlling means receives said busy signals so as to use said busy signals for a temporal parameter-readout control.

13. An image processing apparatus as claimed in claim 12, wherein said parameter controlling means includes:
- a counter for counting a quantity of said busy signals supplied from said decoding means to output a count value;
- a comparator for comparing said count value with a predetermined value to derive a comparison result signal; and,
- a parameter suppressor for suppressing said parameter reading operation in response to said filtering-operation parameters which causes said filtering operation by the distortion removing means to be weakened after said predetermined time period has passed.

14. An image processing apparatus as claimed in claim 12, wherein said parameter controlling means includes:
- a down counter for counting said filtering-operation parameter read out from said memory means to output a count value of the filtering-operation parameter;
- a comparator for comparing said count value of the filtering-operation parameter with said filtering-operation parameter to output one value grater than the other value as a select signal; and,
- a selector for receiving both said filtering-operation parameter and said count value derived from said down counter, and for selecting one of said filtering-operation parameter and said count value in response to said select signal in such a manner that when said filtering-operation parameter is greater than said count value, said filtering-operation parameter is selected as said controlled filtering-operation parameter, whereas when said filtering-operation parameter is equal to, or smaller than said count value, said count value is selected as said controlled filtering-operation parameter after a predetermined time period has passed.

15. An image processing apparatus as claimed in claim 14, wherein said down counter receives said busy signals supplied from said decoding means in order to perform a time counting operation for checking whether or not said predetermined time period has passed.

16. A method for processing input moving-picture image data, comprising the steps of:
- previously storing plural coefficients of variation amounts for pixel values of coded moving-picture image data;
- subtracting the pixel value of said coded moving-picture image data from a pixel value of reference moving-picture image data, thereby obtaining a difference pixel value, said reference moving-picture image data being obtained from distortion-free moving-picture image data acquired during one image data processing cycle before a present image data processing cycle for said coded moving-picture image data; and,
- removing a coding/decoding distortion contained in said coded moving-picture image data by processing said pixel value of the coded moving-picture image data based upon said coefficients derived from said storing step in response to said difference pixel value, thereby producing distortion-free moving-picture image data.

17. A method for processing input moving-picture image data, comprising the steps of:
- previously storing a plurality of variation amounts with respect to pixel values of coded input moving-picture image data;
- subtracting the pixel value of said coded input image data from a pixel value of reference moving-picture image data, thereby obtaining a difference pixel value, said reference moving-picture image data being obtained from distortion-free moving-picture image data acquired during one image-data processing cycle before a present image-data processing cycle for said coded moving-picture image data; and,
- removing a coding/decoding distortion contained in said coded moving-picture image data by processing said pixel value based upon one of said variation amounts selected in response to said difference pixel value, thereby producing distortion-free moving-picture image data.

18. A method for processing input moving-picture image data, comprising the steps of:
- decoding pixel values of the moving-picture image data which have been coded in quantizing step sizes corresponding to the pixel values thereof, thereby obtaining at least decoded moving-picture image data and the quantizing step sizes thereof;
- previously storing a plurality of filtering-operation parameters corresponding to said quantizing step sizes;
- controlling a reading operation of said filtering-operation parameters in such a manner that when said filtering-operation parameters are increased, said parameter reading operation is continuously performed, whereas when said filtering-operation parameters are decreased, said parameter reading operation is performed after a predetermined time period has passed, thereby obtaining controlled filtering-operation parameters; and,
- removing a coding/decoding distortion from said decoded moving-picture image data based on said controlled filtering-operation parameters, thereby distortion-free moving-picture image data is produced.

19. A method for processing input moving-picture image data, as claimed in claim 18.
wherein said decoding step further decodes said pixel values of the coded moving-picture image data so as to obtain busy signals, and said parameter-reading-operation controlling step further receives the busy signals in order to perform a temporal control for the parameter reading operation.

* * * * *